United States Patent
Dingman et al.

(10) Patent No.: US 9,497,168 B2
(45) Date of Patent: Nov. 15, 2016

(54) METHOD AND APPARATUS FOR SUPPORTING COMMUNICATIONS BETWEEN A COMPUTING DEVICE WITHIN A NETWORK AND AN EXTERNAL COMPUTING DEVICE

(75) Inventors: Christopher P. Dingman, Hillsborough, NJ (US);
(Continued)

(73) Assignee: Avaya Inc., Basking Ridge, NJ (US)

( * ) Notice: Subject to any disclaimer, the term of this patent is extended or adjusted under 35 U.S.C. 154(b) by 1560 days.

(21) Appl. No.: 10/208,474

(22) Filed: Jul. 30, 2002

(65) Prior Publication Data
US 2004/0024879 A1 Feb. 5, 2004

(51) Int. Cl.
*G06F 15/16* (2006.01)
*H04L 29/06* (2006.01)
*H04L 29/08* (2006.01)

(52) U.S. Cl.
CPC ..... *H04L 63/0281* (2013.01); *H04L 29/06027* (2013.01); *H04L 63/029* (2013.01);
(Continued)

(58) Field of Classification Search
CPC .............. H04L 29/06578; H04L 29/06585; H04L 29/06591; H04L 29/06598;
(Continued)

(56) References Cited

U.S. PATENT DOCUMENTS 6,104,716 A * 8/2000 Crichton ................. H04L 29/06
370/401
6,195,366 B1 * 2/2001 Kayashima et al. .......... 370/475
(Continued)

OTHER PUBLICATIONS

Rosenberg et al., "Getting SIP Through Firewalls and NATs," Internet Engineering Task Force, Internet Draft (Feb. 22, 2000).
(Continued)

*Primary Examiner* — Dhairya A Patel

(57) ABSTRACT

A network communication bridge establishes communication between a computing system within a protected network and an external computing system. A registrar is positioned outside the protected network and registers authorized users. The registrar determines if the computing device associated with the user is publicly addressable, and for those computing devices that are not publicly addressable, the computing device maintains a persistent communication session with a bridge proxy server. The bridge proxy server employs a reversal or relaying technique to enable communication between two systems that cannot ordinarily establish communication with each other, based on characteristics of the two systems. If at least one party to a communication is publicly addressable, then a reversal technique is employed. If neither party to the communication is publicly addressable, then both parties have a persistent session with their respective bridge proxy server, and the bridge proxy server acts as a "relay service" for communications between the initiator and the recipient. The invention can be implemented as a separate application or as an enhancement to the Session Initiation Protocol (SIP).

18 Claims, 7 Drawing Sheets

(75) Inventors: Priya Mahadevan, Durham, NC (US); Joann J. Ordille, South Orange, NJ (US)

(52) U.S. Cl.
CPC ....... *H04L 65/1006* (2013.01); *H04L 65/1069* (2013.01); *H04L 65/608* (2013.01); *H04L 67/14* (2013.01)

(58) Field of Classification Search
CPC .................. H04L 29/06605; H04L 29/06625; H04L 63/0281; H04L 63/029; H04L 65/1006; H04L 65/1069; H04L 65/608; H04L 29/06027; H04L 67/14
USPC ......................................... 709/227, 228, 229
See application file for complete search history.

(56) References Cited

U.S. PATENT DOCUMENTS

| | | | | |
|---|---|---|---|---|
| 6,557,037 | B1* | 4/2003 | Provino | ........................ 709/227 |
| 6,654,346 | B1* | 11/2003 | Mahalingaiah | ......... H04L 45/04 370/235 |
| 6,744,759 | B1* | 6/2004 | Sidhu et al. | .................. 370/356 |
| 7,181,612 | B1* | 2/2007 | Pellacuru | .......... H04L 29/12367 370/338 |
| 7,584,261 | B1* | 9/2009 | Teodosiu | .................. G06F 8/60 709/217 |
| 8,416,711 | B1* | 4/2013 | Pinding | .............. H04L 61/2546 370/254 |
| 2001/0044903 | A1* | 11/2001 | Yamamoto | .............. H04L 63/02 726/26 |
| 2002/0097724 | A1* | 7/2002 | Halme | ................ H04L 67/1002 370/392 |
| 2002/0122416 | A1* | 9/2002 | Xu | ........................ H04L 29/125 370/352 |
| 2002/0161904 | A1* | 10/2002 | Tredoux | .............. H04L 63/0281 709/229 |
| 2003/0084162 | A1* | 5/2003 | Johnson | .................. H04L 29/06 709/227 |
| 2003/0140142 | A1* | 7/2003 | Marples | ........... H04L 29/12254 709/225 |
| 2003/0154306 | A1* | 8/2003 | Perry | ................ H04L 29/12009 709/245 |
| 2003/0188001 | A1* | 10/2003 | Eisenberg et al. | .............. 709/229 |
| 2003/0217099 | A1* | 11/2003 | Bobde et al. | ............... 709/202 |
| 2007/0189311 | A1* | 8/2007 | Kim | .................. H04L 29/12009 370/401 |

OTHER PUBLICATIONS

B. Biggs, "A SIP Application Level Gateway for Network Address Translation," Internet Engineering Task Force, Internet Draft (Mar. 2000).

Martin et al., "SIP Through NAT Enabled Firewall Call Flows," Midcom Working Group, Internet Draft (Feb. 2001).

Rosenberg et al., "NAT Friendly SIP," Internet Engineering Task Force, Internet Draft (Jul. 20, 2001).

Rosenberg et al., "STUN—Simple Traversal of UDP Through NATs," Internet Engineering Task Force, Internet Draft, (Apr. 5, 2002).

Rosenberg et al., "SIP Traversal Through Residential and Enterprise NATs and Firewalls," Internet Engineering Task Force, Internet Draft (Mar. 2, 2001).

* cited by examiner

REGISTERED USER DATABASE – 700

| USER ID (740) | IP ADDRESS (750) | PORT NUMBER (760) | PUBLICLY ADDRESSABLE ? (770) |
|---|---|---|---|
| 705 | | | |
| 710 | | | |
| ⋮ | ⋮ | ⋮ | ⋮ |
| 720 | | | |

METHOD AND APPARATUS FOR SUPPORTING COMMUNICATIONS BETWEEN A COMPUTING DEVICE WITHIN A NETWORK AND AN EXTERNAL COMPUTING DEVICE

FIELD OF THE INVENTION

The present invention relates generally to network security techniques, and more particularly, to methods and apparatus for enabling communication between a system within a protected network and an external system.

BACKGROUND OF THE INVENTION

A number of problems are encountered when a computing device, such as a portable computer or a Personal Digital Assistant (PDA), attempts to communicate over the Internet with one or more systems within an enterprise. Various network configurations impede initiating communication via the Transmission Control Protocol (TCP) or the User Datagram Protocol (UDP) from a computing device outside the enterprise to a system within the enterprise. Similarly, it is also difficult to initiate communication from systems within enterprise networks to external portable devices.

A system within an enterprise is typically protected by a firewall or a Network Address Translator (NAT) (or both). Many network address translators do not support addressing for communication initiated from outside the network to a system within the network. Most firewalls are configured to prevent communications initiated from machines outside the network to protect systems within the enterprise network from intruders. While most systems within the enterprise network can initiate communication to systems outside the enterprise, they are typically unable to receive communications initiated from outside machines. More often than not, these outside requests are dropped by the firewall if the internal machines are at all publicly addressable.

In addition, the service providers for the portable devices that communicate over a wireless network often do not allow communication initiated from outside their network to devices on their network. Mobility of the user may also mean that the portable device has a dynamic IP address. These devices would find it difficult to receive communication initiations from other systems either because their IP address is unknown to other systems or the service provider prevents incoming communications.

Users who are away from their enterprise need to connect to systems within their enterprise network in a secure fashion. Virtual Private Networks (VPNs) allow communication between two systems on the Internet, but utilize a significant amount of resources on the portable devices. Portable devices, however, typically have resource constraints that make a lighter weight solution desirable. Dial-in software allows a portable device to communicate with systems within an enterprise network, but dial-in software requires a telephone line and does not take advantage of the increasing availability of Internet access and applications. Furthermore, Virtual Private Networks and dial-in software are not generic. For example, they do not provide a solution when two portable devices accessing the Internet via a wireless modem want to communicate with one another. Thus, it is not uncommon to have a scenario wherein neither the system within the enterprise network can initiate communication with the external personal device nor can the external personal device initiate communication with the system within the enterprise network.

A number of techniques have been proposed or suggested to permit communications between an external device and a system within an enterprise network. Visto Corporation, for example, employs holes in firewalls to make outgoing connections to portable devices. A similar approach is described in B. Biggs, "SIP Application Level Gateway for Network Address Translation," Internet Engineering Task Force (IETF), Internet Draft (March, 2000). It is not always possible, however, to create a hole in a firewall, and in any case, such a solution is not a general one (as it requires special firewall support). Even when a firewall does allow the creation of such holes, firewall administrators are often reluctant to create such holes for user applications, since any hole in a firewall makes the enterprise system vulnerable to an attack.

Portable devices are increasingly establishing communications in accordance with the Session Initiation Protocol (SIP), described, for example, in M. Handley et al., "SIP: Session Initiation Protocol," RFC 2543 (March 1999). Generally, SIP is an application level protocol used to establish multimedia sessions between two or more systems. The SIP community is pursuing two types of solutions to permit communications between an external device and a system within an enterprise network. A first approach advocates making the firewalls or network address translators SIP-aware and a second approach advocates making SIP firewall/network address translator-friendly.

The SIP community pursuing the first approach is working to specify an application program interface (API) that allows applications, including SIP applications, to request the specific kind of support they need from the firewall. For example, applications might request that the firewall provide an external address and port number for the application to receive incoming TCP requests or UDP messages. Specifying this API, and therefore making firewalls and NATs SIP-aware, is part of the task of the Middlebox Communication (MIDCOM) Working Group of the IETF. A MIDCOM solution faces multiple obstacles. Specifically, agreement must first be reached on the protocol, vendors must thereafter implement the protocol in their products, enterprises must purchase the new products, and firewall administrators must permit the use of these features.

The second approach was proposed by Rosenberg, Weinberger and Schulzrinne. See, J. Rosenberg and H. Schulzrinne, "SIP Traversal Through Residential and Enterprise NATs and Firewalls," Internet Engineering Task Force, Internet Draft (Mar. 2, 2001), further revised in "NAT Friendly SIP," Internet Engineering Task Force, Internet Draft (Jul. 20, 2001). With respect to NATs, Rosenberg et al. propose to enhance the SIP user agents to engage in a test regime with multiple new kinds of test facilitator servers on the external network to identify the type of NAT that exists between the user agent and the external network. The user agent has the burden of testing for NAT-type. Generally, Rosenberg et al. propose disguising the traffic as web traffic so that it will be passed by the firewall.

The restrictions of NATs and firewalls create an environment where it is often difficult for employees with portable devices, users in different enterprises, employees at home and other users to communicate with systems within an enterprise. A need therefore exists for a method and apparatus that supports communications between a computing system within a protected network and an external computing system, such as a portable device. A further need exists for a method and apparatus that supports secure communication between portable devices and systems within an enterprise or another network.

SUMMARY OF THE INVENTION

Generally, a method and apparatus are disclosed for establishing a communication between a computing system within a protected network, such as an enterprise network, and an external computing system. The disclosed network communication bridge enables communication between two systems that cannot ordinarily establish communication with each other, because a Network Address Translator or a firewall (or both) is interfering. The network communication bridge includes a registrar that is positioned outside the protected network and accepts and processes registration messages from authorized users who want to use the service. The registrar determines if the computing device associated with the user is publicly addressable, and for those computing devices that are behind a Network Address Translator or a firewall (or both), the computing device maintains a persistent communication session with a bridge proxy server to enable communication with external devices.

A bridge proxy server employs either a reversal or relaying technique to enable communication between two systems that cannot ordinarily establish communication with each other, based on characteristics of the two systems. If at least one party to a communication is publicly addressable, then the message is forwarded to the indicated recipient. For example, assuming user B knows that it is publicly addressable, user B starts listening on port number y and sends a message to user A to contact user B on port number y. The request that user B sends to user A is sent to the bridge proxy server associated with user A. The bridge proxy server forwards the message to user A and user A then initiates communication with B on port y. This technique is referred to as a "reversal."

If neither party to the communication is publicly addressable, then both parties would have previously established a persistent session with their respective bridge proxy server as part of the registration process. The initiator's request is forwarded to the bridge proxy server of the recipient and is received by the bridge proxy server. The bridge proxy server recognizes that the initiator is requesting a port, with which it can communicate with the recipient, and since the recipient is not publicly addressable, the bridge proxy server opens a port for the initiator to use. In addition, the bridge proxy server opens a port with which the recipient can initiate communication. The bridge proxy server notifies the recipient that the initiator wants to communicate with the recipient on this newly opened port. The recipient can then initiate communication on its new port with the bridge proxy server. The initiator also initiates communication with the port specified by the bridge proxy server and all packets for the recipient are sent on the new data session the recipient has created with the bridge proxy server. In this manner, the bridge proxy server acts as a "relay service" for all communication between the initiator and the recipient.

The invention provides a solution to the NAT/firewall problem that is generic, lightweight and secure. The invention can be implemented as a separate application using a proprietary protocol, or as an enhancement to the Session Initiation Protocol. The invention provides an alternative to Virtual Private Networks (VPNs) and dial-in access, and supports general communication services including TCP and UDP data services as well as the more typical voice and video services supported by SIP.

A more complete understanding of the present invention, as well as further features and advantages of the present invention, will be obtained by reference to the following detailed description and drawings.

DETAILED DESCRIPTION

Figure 1:
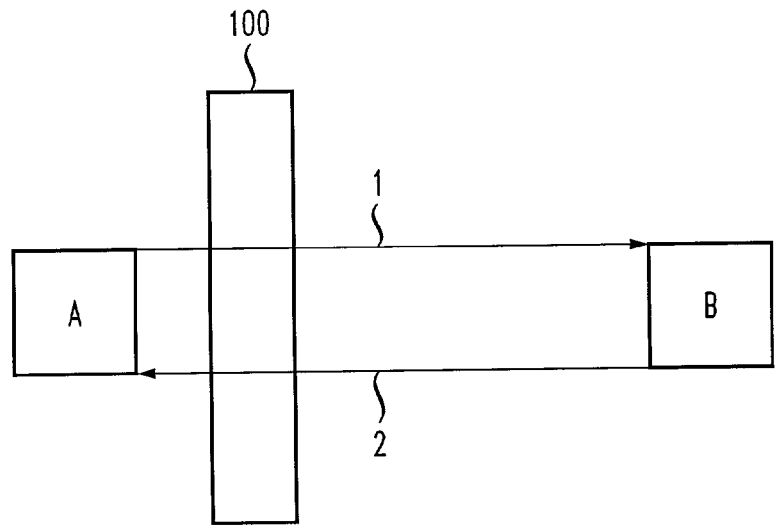
FIG. 1 illustrates a conventional symmetric NAT/firewall.

The present invention provides an architecture for enabling communication between two systems that cannot ordinarily establish communication with each other, because a Network Address Translator or a firewall (or both) interferes. The present invention provides a solution to the NAT/firewall problem that is generic, lightweight and secure. The present invention can be implemented as a separate application using a proprietary protocol, or as an enhancement to the Session Initiation Protocol. The present invention provides an alternative to Virtual Private Networks and dial-in access, and supports general communication services including TCP and UDP data services as well as the more typical voice and video services supported by SIP.

As previously indicated, most firewalls do not allow communication initiation from outside of an enterprise network to a device within the enterprise network protected by the firewalls. In addition, NATs cause additional problems for communication between an external device and a device connected to a protected network (or vice versa). Specifically, systems outside the enterprise network are unaware of the IP address of the internal device and hence cannot initiate communication with the internal device.

The present invention provides a network communication bridge 300, discussed further below in conjunction with FIG. 3, that allows a user connected to a protected network to communicate with an external user. A network communication bridge 300 according to the present invention includes a registrar 400, discussed further below in conjunction with FIG. 4, that accepts registration messages 330 from all authorized users who want to use the service. According to one aspect of the invention, the registrar 400 is positioned outside the protected network. The registrar 400 conducts a test to determine if the computing device associated with the user is publicly addressable (i.e., if the computing device can be reached from any computing device outside the enterprise). For those computing devices that are not publicly addressable, the registrar 400 recommends that the computing devices maintain a persistent communication session with a bridge proxy server 500, discussed further below in conjunction with FIG. 5. For those cases where two computing devices cannot communicate directly with each other, the present invention use the services of the bridge proxy server 500 to relay packets from one computing device to the other computing device.

Overview of NATs and Firewalls

Network Address Translators (NATs)

NATs supply a stopgap solution to the IP address shortage problem, and they enhance security by hiding internal IP addresses from outsiders. A NAT, usually deployed on a network edge connecting two networks together, translates an internal private IP address of a system to a publicly routable IP address, before packets are forwarded outside the network, thereby enabling internal systems to communicate with outside systems.

NATs are of two types, namely, traditional NATs and bi-directional NATs. Traditional NATs allow systems inside the network to successfully initiate and talk to systems outside the network. However, outside machines cannot initiate communication with systems within the network. In other words, the creation of a communication session is uni-directional, outbound from the internal network. A communication session is a TCP connection or a series of related UDP messages between the same source and destination ports. A UDP session might be a simple request-response pair of messages, a Real Time Protocol (RTP) audio stream or other sessions between the same pair of ports as in Trivial File Transfer Protocol (TFTP).

Traditional NATs are often used in conjunction with firewalls, because they protect the enterprise from incoming communications. There are two types of traditional NATs, namely, basic NATs and Network Address Port Translators (NAPTs). In a basic NAT, a block of external IP addresses is available for outside communication. An internal address is translated to an external address when the packet leaves the network. In a NAPT, in addition to translating addresses, port numbers are also translated, thereby enabling the conservation of IP addresses (in the sense that more than one internal IP address could be translated to the same external IP address but with different external port numbers). In the basic NATs, since port numbers are not translated, different internal IP addresses must map to different external IP addresses for ongoing sessions.

Deploying uni-directional NATs poses a problem to servers that run on internal systems, as clients outside the network are unaware of their IP addresses and hence unable to initiate communication with them. Deploying bi-directional NATs, which permit both inbound and outbound sessions, solves this problem, but with increased vulnerability of internal systems to attacks by intruders. Bi-directional NATs supply either static or dynamic IP address translations. If a static translation from an internal IP address to an external IP address is known or a dynamic translation is long-lived, the external address can be used to initiate communication with the internal system unless such communication initiations are prevented by a firewall.

In addition, Application Level Gateways (ALGs) are usually deployed in conjunction with NATs to perform payload address translations. Many applications, such as file transfer protocol (FTP) applications, send addresses and port numbers as part of the payload. NATs only translate addresses in the IP header and port numbers in the transport header. For applications that send addresses and ports as part of the payload to function correctly, it is imperative to translate addresses in the payload as well. ALGs are application specific; they scan an application's payload to do a corresponding address translation.

To summarize, support for both inbound and outbound sessions requires the deployment of bi-directional NATs with address translations that are static or long-lived. Each application that requires payload translation needs to have an ALG working in conjunction with the NAT.

Firewalls

As a safety measure, most firewalls are configured to drop incoming TCP connection request packets. Firewalls also drop most incoming UDP packets, in general allowing only UDP responses to an immediately prior UDP request on a well-known port number. In addition, some firewalls may perform packet filtering that blocks certain protocols or port numbers from transiting the firewall.

For UDP traffic, where there is no concept of a connection, firewalls and NATs can be classified as symmetric or cone firewalls depending on the way they allow incoming packets into the enterprise. FIG. 1 illustrates a symmetric NAT/firewall 100. Once a system within an enterprise sends a UDP packet outside the enterprise, symmetric NATs and firewalls allow response packets from the system to which the UDP packet was sent. The destination IP address and port number of the response packet match the source IP address and port number of the request packet. The source IP address and port number of the response packet match the destination IP address and port number of the request packet. The system within the network can communicate with the system outside the network, provided the inside system sends out the initial packet.

Figure 2:
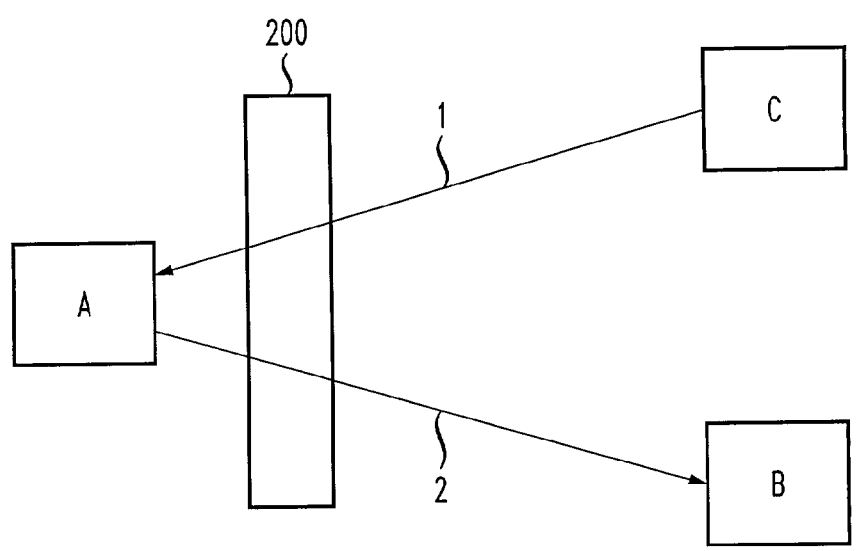
FIG. 2 illustrates a conventional cone NAT/firewall.

FIG. 2 illustrates a cone NAT/firewall 200. Cone NATs/firewalls are different from symmetric NAT/firewalls 100, in the sense that once a system within the enterprise sends a packet to a system outside the enterprise, any system from outside the enterprise can send response packets to this system within the enterprise. The destination IP address and port number of the response packet must match the source IP address and port number of the request packet. As shown in FIGS. 1 and 2, when system A, is behind a symmetric NAT/firewall 100, system A can receive UDP packets only from system B outside the enterprise, provided system A has first sent out a UDP packet to system B. In the case of a cone NAT/firewall 200, system A can receive packets from system C, even though system A has only sent out a UDP packet to system B. Both B and C are outside the enterprise.

Network Communication Bridge

As previously indicated, most firewalls are configured in such a way that they do not allow communication initiation from the outside to a system within the enterprise they are protecting. Deployment of NATs has its own drawbacks. Specifically, systems outside the enterprise are unaware of the IP address of the internal system and hence cannot initiate communication with the internal system. In certain cases, a provider will block incoming connection requests even though the internal device has a publicly routable IP address. The present invention helps such systems communicate with each other in a secure fashion.

Figure 3:
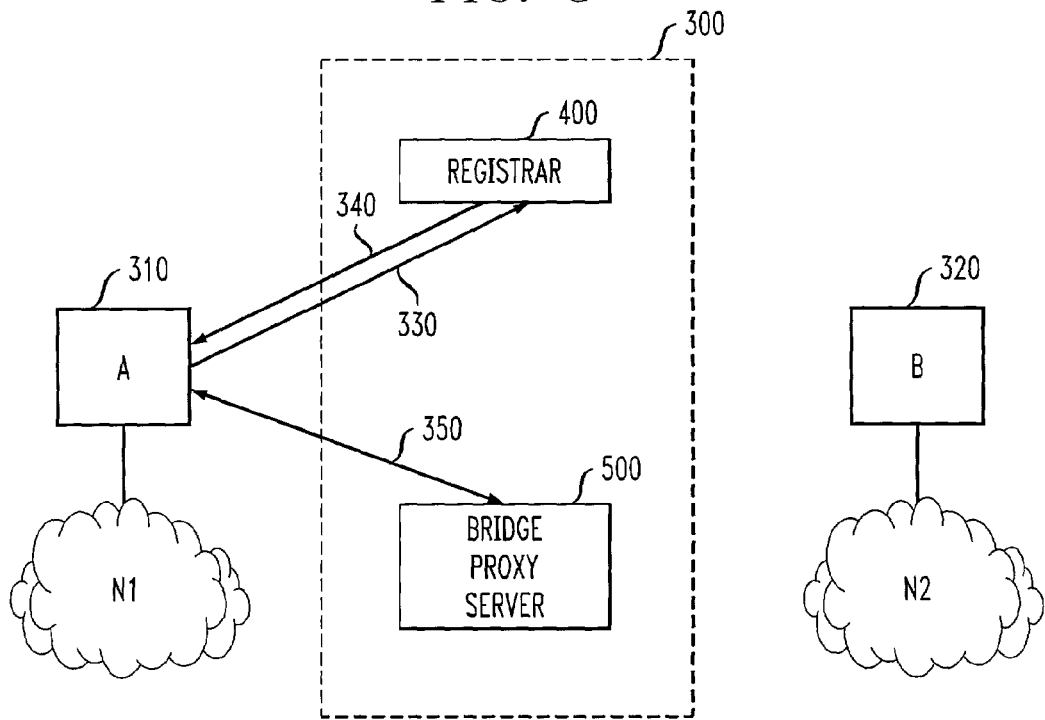
FIG. 3 illustrates a network communication bridge in accordance with the present invention.

FIG. 3 illustrates a network communication bridge 300 in accordance with the present invention that allows user A employing a computing device 310 within a network N1 to communicate with user B employing a computing device 320 that is external to network N1. The computing device 310 is connected to a first network N1 (typically associated with a first enterprise) and the computing device 320 is connected to a second network N2 (typically associated with a second enterprise). The networks N1 and N2 may each typically provide one or more connections to a public network, such as the Internet. The connections to the public network are typically protected by a network address translator or a firewall (or both), in the manner described above.

As shown in FIG. 3, the network communication bridge 300 according to the present invention includes a registrar 400, discussed further below in conjunction with FIG. 4, that accepts registration messages 330 from all authorized users who want to use the service. The registrar 400 then conducts a test (referred to as a check address message 340) to determine if the computing device associated with the user is publicly addressable (i.e., if the computing device can be reached from any computing device outside the enterprise). For those computing devices that are not publicly addressable, the registrar 400 recommends that the computing devices maintain a persistent communication session, such as the persistent communication session 350 associated with user A, with a bridge proxy server 500, discussed further below in conjunction with FIG. 5. For those computing devices 310, 320 that must maintain a persistent communication session with a bridge proxy server 500, the registrar 400 optionally provides a list of proxy servers that they could contact. The list of proxy servers would typically include publicly available bridge proxy servers 500 known to registrar 400. As discussed hereinafter, for those cases where it is impossible to have the two computing devices 310, 320 communicate directly with each other, the present invention use the services of the bridge proxy server 500 to relay packets from one computing device 310 to the other computing device 320 and vice versa.

According to one aspect of the invention, the registrar 400 is positioned outside the enterprise or protected network N1, N2. Any computing device 310, 320 that needs to use the network communication bridge 300 has to register with the registrar 400. FIG. 4 is a schematic block diagram of an exemplary registrar 400. The registrar 400 may be embodied as a general purpose computing system, such as the general purpose computing system shown in FIG. 4. The registrar 400 includes a processor 410 and related memory, such as a data storage device 420, which may be distributed or local. The processor 410 may be embodied as a single processor, or a number of local or distributed processors operating in parallel. The data storage device 420 and/or a read only memory (ROM) are operable to store one or more instructions, which the processor 410 is operable to retrieve, interpret and execute.

Figure 4:
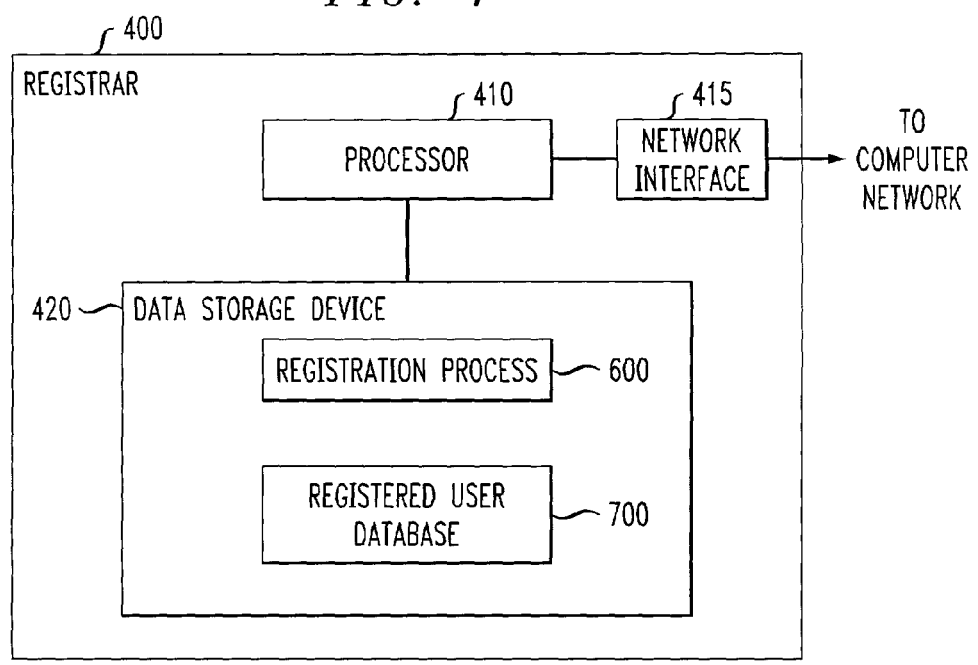
FIG. 4 is a schematic block diagram of the registrar of FIG. 3.

As shown in FIG. 4 and discussed further below in conjunction with FIG. 6, the data storage device 420 contains a registration process 600 that allows any user that wishes to use the network communication bridge 300 to register with the registrar 400. In addition, as shown in FIG. 4 and discussed further below in conjunction with FIG. 7, the data storage device 420 contains a registered user database 700 that records the contact information obtained by the registration process 600.

Figure 5:
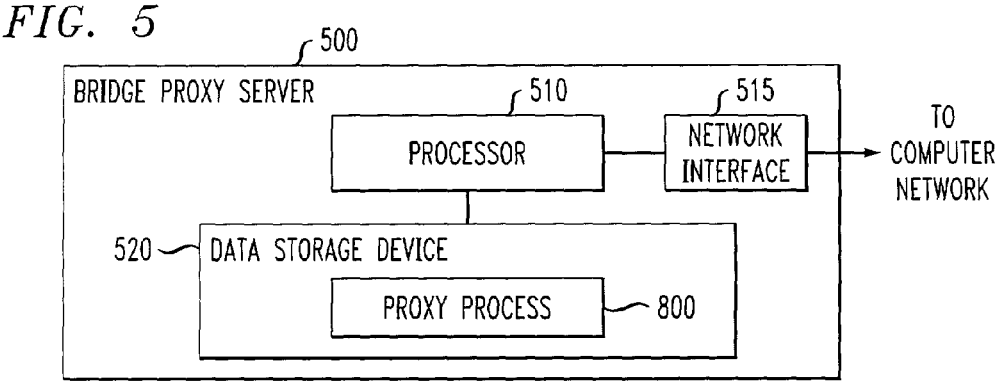
FIG. 5 is a schematic block diagram of the bridge proxy server of FIG. 3.

FIG. 5 is a schematic block diagram of an exemplary bridge proxy server 500. As shown in FIG. 5, the bridge proxy server 500 may be embodied as a general purpose computing system, similar to the general purpose computing system discussed above in conjunction with FIG. 4. As shown in FIG. 5 and discussed further below in conjunction with FIG. 8, the data storage device 520 contains a proxy process 800 that facilitates communications between two devices, where at least one device is not publicly addressable. Generally, the proxy process 800 provides supporting services that include reversing the call initiator and call recipient during a communication initiation (when at least one party is publicly addressable) and relaying data packets (when neither party is publicly addressable).

Figure 6:
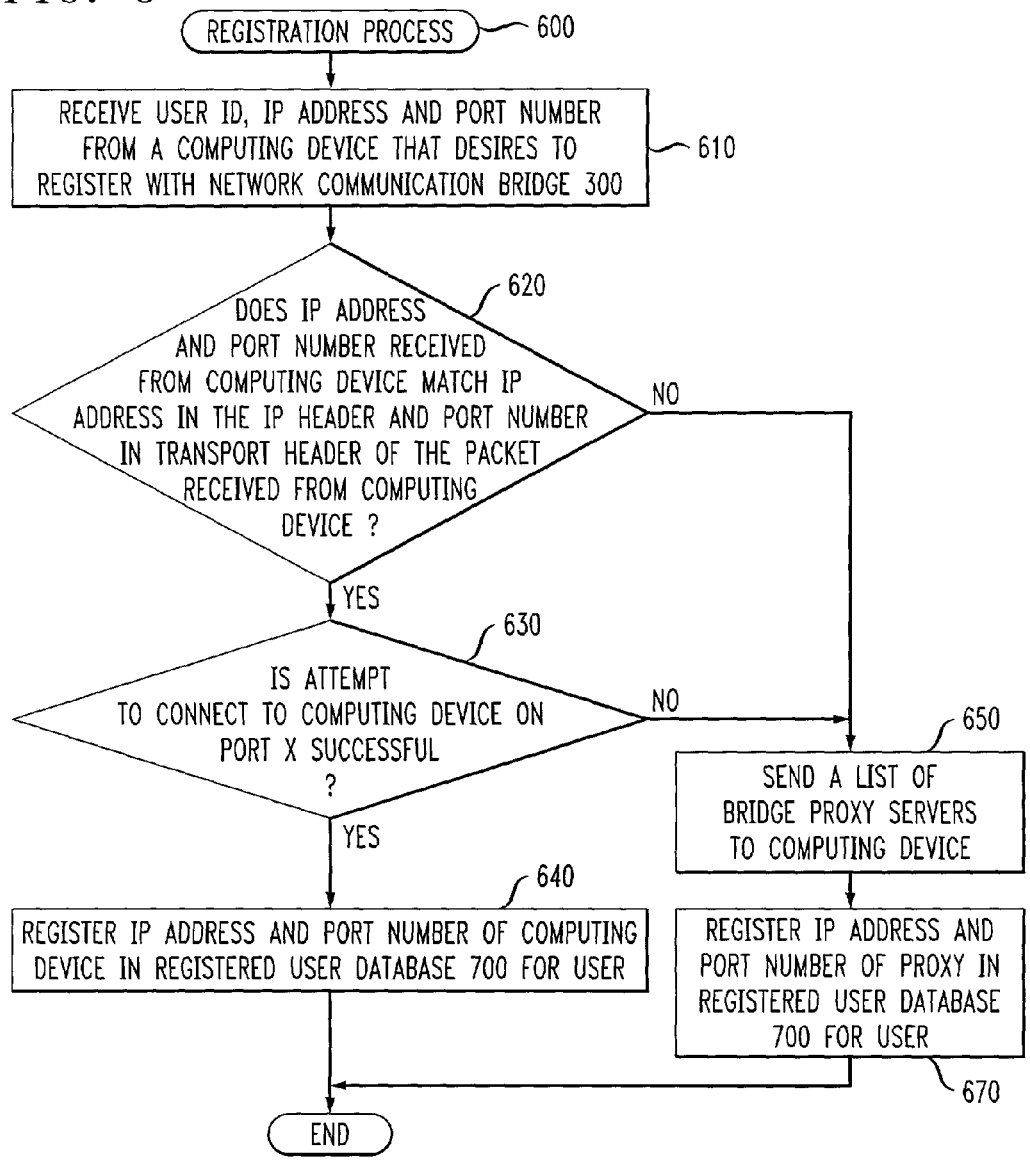
FIG. 6 is a flow chart describing an exemplary implementation of the registration process of FIG. 4.

FIG. 6 is a flow chart describing an exemplary implementation of the registration process 600 incorporating features of the present invention. As shown in FIG. 6, the registration process 600 is initiated by the registrar 400 when the registrar 400 receives the user identifier, IP address and port number from a computing device 310, 320 associated with a user that desires to register with the network communication bridge 300. For example, when user A wants to register with the registrar 400, user A sends its user identifier, IP address and port number to the registrar 400 as part of the registration process. User A also starts listening on some port number, such as port x.

A test is then performed during step 620 to compare the IP address and port number received from user A (computing device 310) with the IP address in the IP header and the port number in the transport header of the packet received from A. If it is determined during step 620 that these parameters match, then the registrar assumes that A is not behind a NAT. It is noted that multi-homed systems might send the packet on one interface while including the IP address of another interface thereby appearing to be behind a NAT. Multi-homed systems can send all their addresses in the message or a test by the bridge proxy server 500 to determine if the apparent NAT address is static would allow the bridge proxy server 500 to discover that the address is publicly routable.

Even if it is determined during step 620 that the parameters match, there still exists the possibility that user A (computing device 310) could be behind a firewall that disallows incoming connection requests. To verify this, the registrar 400 tries connecting to user A (computing device 310) on port x. A test is then performed during step 630 to determine if the connection initiation is successful. If it is determined during step 630 that the connection initiation was successful, then the registration process 600 assumes that user A is publicly addressable (i.e., any other system on the Internet can reach user A). The registrar 400 registers the IP address and port number of user A (computing device 310) during step 660 in the registered user database 700 for user A.

If, however, it is determined during step 630 that the connection initiation fails or during step 620 that the addresses do not match, the registrar 400 optionally sends a list of bridge proxy servers 500 to user A during step 650 and recommends that user A maintain a persistent session with one of these servers. The registrar 400 communicates its results to user A via the communication session that user A initiated with it. Once A establishes a persistent communication session with a bridge proxy server 500, if necessary, the registrar 400 registers the proxy's IP address and port number as A's address during step 670 in the registered user database 700.

Thus, once user A is registered, whenever any other system wants to communicate with user A, the registrar 400 would provide the appropriate contact information (either the IP address and port number of user A (computing device 310), if computing device 310 is publicly addressable, or the address of the appropriate bridge proxy server 500, if computing device 310 is not publicly addressable). In this manner, if computing device 310 is not publicly addressable, any requests to communicate with user A are then routed to the bridge proxy server 500 which forwards them to A (using the persistent session maintained by user A). It is noted that this technique can be extended to test if a NAT-translated address is static or dynamic. Static NAT translations can be treated as public addresses while dynamic NAT translations require a persistent session with the bridge proxy server 500.

Figures 7, 8:
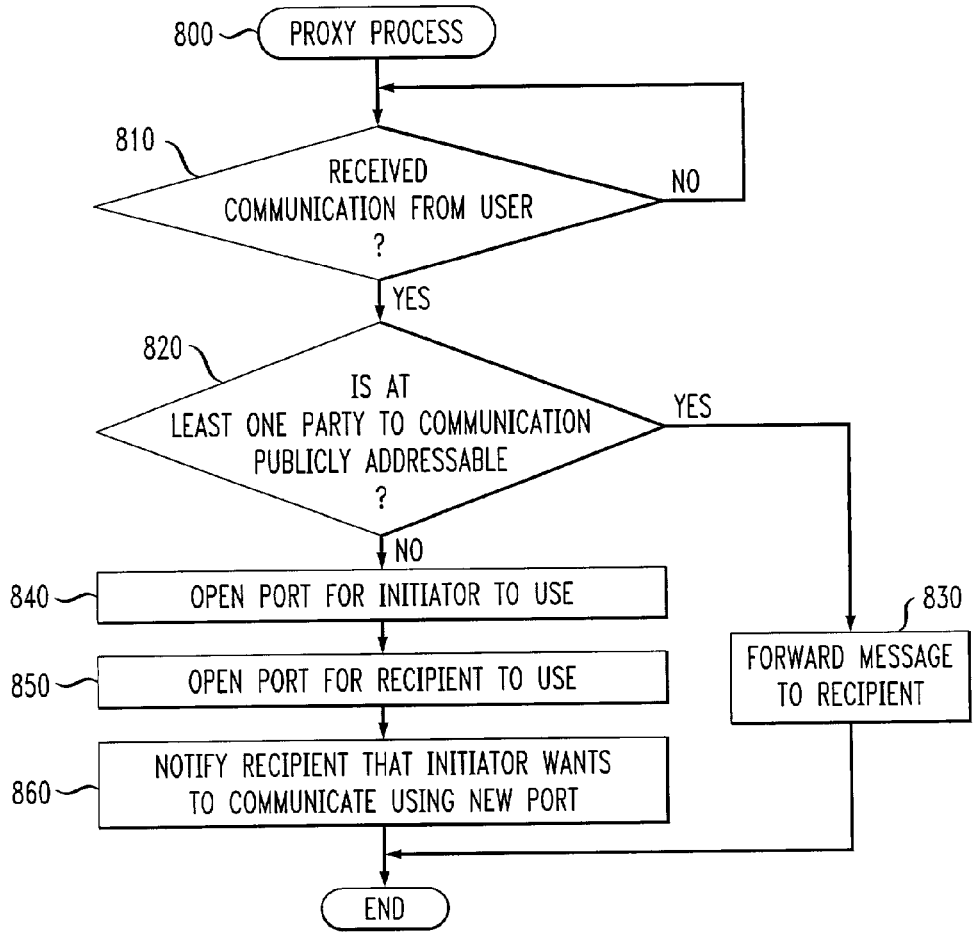
FIG. 7 is a sample table from the exemplary registered user database of FIG. 4.
FIG. 8 is a flow chart describing an exemplary implementation of the proxy process of FIG. 5.

FIG. 7 is a sample table from the registered user database 700 of FIG. 4. As shown in FIG. 7, the registered user database 700 includes a plurality of records, such as records 705-720, each associated with a different registered user. For each user identified in field 740, the registered user database 700 indicates the IP address and port number to be utilized to communicate with the user in fields 750 and 760, respectively. It is again noted that if the computing device 310 associated with the user is publicly addressable, the registered user database 700 would indicate the IP address and port number of user A (computing device 310), or if computing device 310 is not publicly addressable, then the registered user database 700 would indicate the address of the appropriate bridge proxy server 500 in fields 750 and 760. In addition, the registered user database 700 optionally includes a flag in field 770 indicating whether the user is publicly addressable.

FIG. 8 is a flow chart describing an exemplary implementation of the proxy process 800 incorporating features of the present invention. As shown in FIG. 8, the proxy process 800 is initiated by the bridge proxy server 500 when the bridge proxy server 500 receives a communication during step 810. Once a communication is received, the proxy process 800 performs a further test during step 820 to determine if at least one of the parties to the communication is publicly addressable.

If it is determined during step 820 that at least one of the parties to the communication is publicly addressable, then the message is forwarded to the indicated recipient during step 830. For example, user B knows that it is publicly addressable. User B starts listening on port number y and sends a message to user A to contact user B on port number y. The request that user B sends to user A is sent to the bridge proxy server 500 (as that is the address stored by the registrar 400) and received by the bridge proxy server 500 during step 810. The bridge proxy server 500 forwards the message to user A during step 830 and user A then initiates communication with B on port y. This is referred to as a "reversal."

If, however, it is determined during step 820 that neither party to the communication is publicly addressable, then both parties would have established a persistent session with their respective bridge proxy server 500 as part of the registration process 600. The initiator's request is forwarded to the bridge proxy server 500 of the recipient and is received by the bridge proxy server 500 during step 810. The bridge proxy server 500 sees that the initiator is requesting a port, with which it can communicate with the recipient, and since the recipient is not publicly addressable, the bridge proxy server 500 opens a port for the initiator to use during step 840. In addition, the bridge proxy server 500 opens a port with which the recipient can initiate communication during step 850. The bridge proxy server 500 notifies the recipient, for example, using its persistent session with the recipient, that the initiator wants to communicate with the recipient on this newly opened port during step 860.

The recipient can then initiate communication on its new port with the bridge proxy server 500. The initiator also initiates communication with the port specified by the bridge proxy server 500 and all packets for the recipient are sent on the new data session the recipient has created with the bridge proxy server 500. In this manner, the bridge proxy server 500 acts as a "relay service" for all communication between the initiator and the recipient.

For example, to establish a relay, the bridge proxy server 500 may tell user A to connect to port 1 on the proxy and may tell user B to connect to port 2 on the same or a different bridge proxy server 500. Thereafter, the bridge proxy server 500 takes data received on port 1, changes the return address to indicate the proxy server 500, and sends the data to user B. Similarly, the bridge proxy server 500 takes data received on port 2, changes the return address to indicate the proxy server 500, and sends the data to user A.

Communication Scenarios

When any two systems, such as systems A and B, want to communicate with each other, a number of different cases are thus possible, as follows. It is noted that a reversal is either initiated (case 1a) or not (case 1b), for case 1, depending on whether or not the call initiator is publicly addressable. The bridge proxy server 500 sets up a relay between the two non-public users for case 2. Case 3 is a trivial case and the two systems A and B can talk directly using Case 1a for whichever system initiates communication.

Case 1a—B is Public and Wants to Communicate with A, Who is not Public

In this case, B knows that it is publicly addressable and hence anyone can connect to it. B starts listening on port number y and sends a message to A to contact it on port number y. The request that B sends A is sent to the bridge proxy server 500 (as that is the address stored by the registrar 400) and the bridge proxy server 500 delivers this message to A. A then initiates communication with B on port y.

Case 1b—A is not Public and Wants to Communicate with B, Who is Public

In this case, A wants to initiate communication with B. A knows that A is not publicly reachable and sends a message to B requesting a port with which it can initiate communication. The message is forwarded directly to B, as B is publicly addressable. B then starts listening on a port number that it sends to A via the proxy. A initiates communication with B on this port.

Case 2—Both A and B are not Public

Here, neither A nor B is publicly addressable. Both A and B would have maintained a persistent session with their respective bridge proxy server 500. When A wants to contact B, A's request is forwarded to B's bridge proxy server 500. The proxy 500 sees that A is requesting a port, with which it can communicate with B, and since B is not publicly addressable, the proxy 500 opens a port for A to use. At the same time, the proxy 500 opens a port with which B can initiate communication. The bridge proxy server 500 uses its persistent session with B to notify B that A wants to communicate with B on this newly opened port. B initiates communication on its new port with the bridge proxy server 500. A also initiates communication with the port specified by the proxy 500 and all packets for B are sent on the new data session B has created with the bridge proxy server 500. The proxy 500 acts as a relay service for all communication between A and B.

Case 3—Both A and B are Public

This is a trivial case and the two systems A and B can talk directly using Case 1a for whichever system initiates communication.

UTDP Implementation Issues

The persistent sessions and session initiation techniques described above map directly to TCP connections. In UDP, which is connectionless, additional considerations must be addressed. If a system, such as system A, is behind a symmetric firewall/NAT, such as the symmetric firewall/NAT 100 shown in FIG. 1, system A can maintain a persistent UDP session with the bridge proxy server 500 by sending keep-alive messages periodically to maintain its path through the firewall. In order to communicate with other systems, system A would then need to either initiate a separate data session with the bridge proxy server 500 or initiate a UDP session directly with the desired system publicly reachable for UDP traffic.

For a cone NAT/firewall, such as the cone NAT/firewall 200 shown in FIG. 2, the inside system A also initiates a UDP session with the bridge proxy server 500 and keeps this session alive. Other Internet systems can then send requests to initiate communication directly to system A by using the same destination address and port number as those used by the bridge proxy server 500 in the persistent session. In cases where the internal system A is behind a NAT/firewall but not a NAPT, the internal system A can create other ports for UDP sessions by sending an initial UDP request to a discard port on the bridge proxy server 500. In the cases where a NAPT is used, the bridge proxy server 500 must assist in the communication initiation by communicating the translated address and port number to the internal system A or the other party in the communication.

SIP Overview

As discussed below in the section entitled "SIP Implementation," SIP can support the network communication bridge 300 of the present invention with only a few changes. While SIP allows any two end-points to establish media sessions with each other, it also supports locating the end-points, exchanging the media information that enables the session to be established and closing down the session. Typically, SIP is used for setting up voice and video calls, conferencing calls, multicast sessions, and more recently instant messaging.

Figure 9:
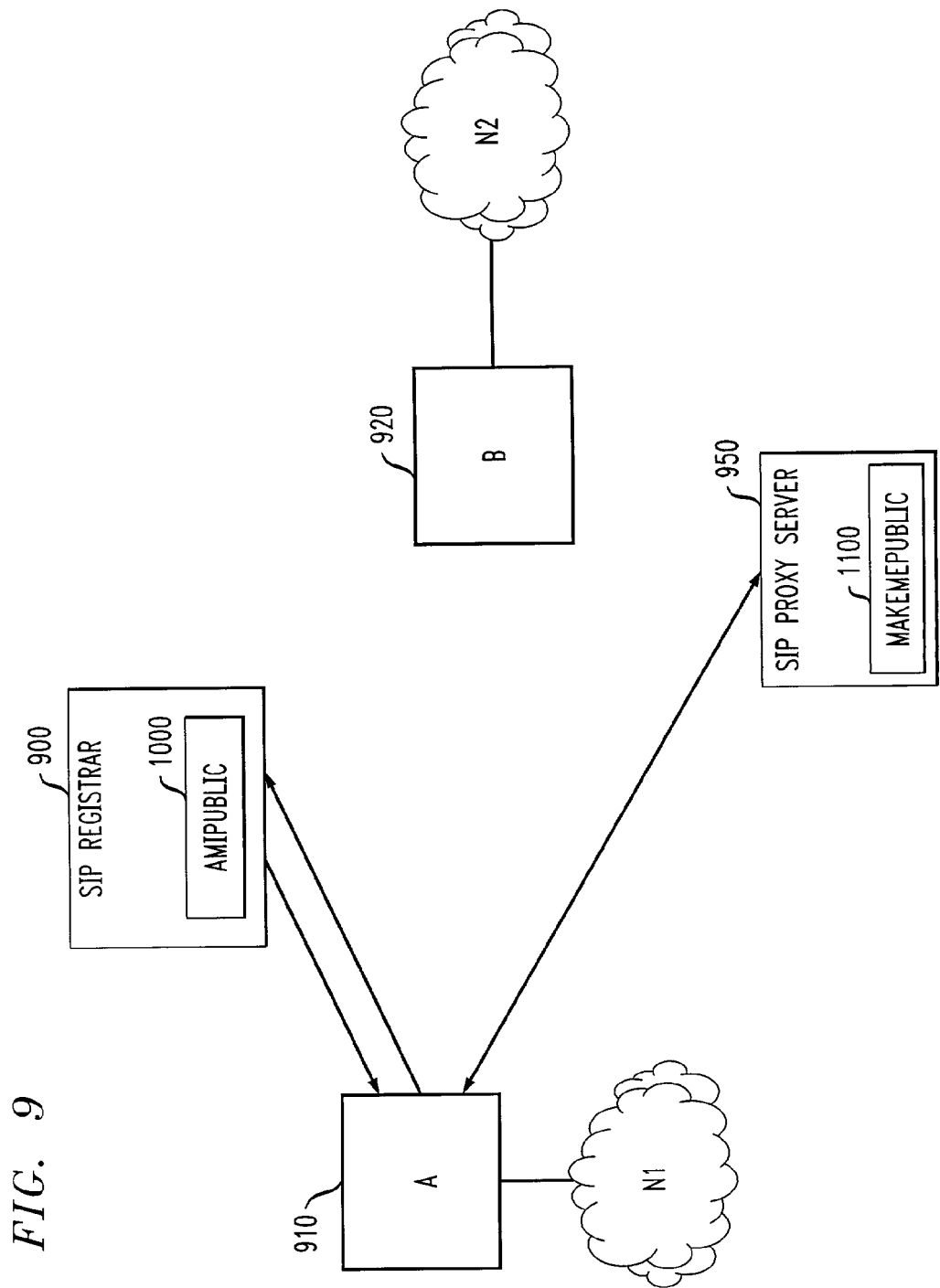
FIG. 9 illustrates a SIP implementation of a network communication bridge in accordance with the present invention.

As shown in FIG. 9, a typical SIP system consists of user agents 910, 920 (the caller is called the "user agent client" while the callee is called the "user agent server"), registration servers 900, and SIP proxies 950 deployed all across the network. Typically, every user sends a registration message ("REGISTER") to the registration server 900, which stores the user's location. Typically, a SIP registration server 900 also provides a location service. Thus, in a SIP implementation, the registrar 400 discussed above in conjunction with FIGS. 3 and 4, can be implemented as a SIP registration server 900. SIP registration servers 900 thus receive registrations from users and they make this information available to SIP proxy servers 950. Registration servers 900 typically require the user agent to be authenticated.

In a conventional SIP network, the SIP proxy 950 handles the routing of requests on behalf of a user agent, much as a proxy for HTTP handles web requests for client browsers. In many cases, the registrar 900 is part of a SIP proxy system 950 (i.e., they are located in the same physical system).

The user's location information is supplied to other users or proxies who query the location service of the registration server 900 to obtain a particular user's address. Once the registration is completed, the registration information must be periodically refreshed to let the registrar 900 know that the address for that user is still valid. The user is then ready to receive messages from other SIP users.

When a user A wants to contact another user B, the user A sends a SIP INVITE message to user B. This INVITE method is routed to user B through SIP proxies that are deployed in the network. User B responds to this INVITE message by accepting (200 OK response message) or rejecting (with an error response message) the call. Information about the session is sent in the exchanged INVITE and OK messages. SIP uses the Session Description Protocol (SDP), described, for example, in M. Handley and V. Jacobson, "SDP: Session Description Protocol," RFC 2327 (April 1998), in the message body to give information about sessions (whether the underlying protocol is, e.g., TCP or UDP, port numbers of the caller and callee, and their respective contact addresses).

The SIP proxies receive requests from user agents and act on behalf of the user agent in forwarding or responding to the request. The proxy server does not issue a request, it only responds to requests from user agents. SIP proxies can either maintain state or be stateless. Proxies closer to the network edge usually maintain state, while those in the middle of the network can be stateless.

The various types of SIP requests, called methods, are described briefly herein. For a more detailed discussion of the SIP protocol and the various types of SIP requests, see, for example, M. Handley et al., "SIP: Session Initiation Protocol," RFC 2543 (March 1999), incorporated by reference herein. These methods are considered verbs in the protocol as they request a specific action to be taken by the user agents, registrars or the proxy servers.

INVITE

The INVITE method, as the name suggests, is used to invite other users to join a session. Responses to the INVITE method are always acknowledged with the ACK method. The message body of the INVITE contains media information of the caller. The INVITE message body typically uses the SDP protocol to exchange media information for the session.

REGISTER

The REGISTER method is used when a user wants to notify the SIP system of his/her current location. The REGISTER method also has an Expires header and a user must periodically REGISTER with the registrar to maintain his/her status. Third party registration is also supported wherein a third party sends the REGISTER method to the registrar on behalf of the actual user.

BYE

The BYE method is used to terminate an already established session. The BYE method, unlike the REGISTER method, cannot be sent by a third party. Only user agents participating in the session can send a BYE method.

ACK

The ACK method is used to acknowledge responses to INVITE requests. The ACK method is not used as a response for the other methods.

CANCEL

The CANCEL method is used to terminate pending call attempts. The CANCEL method can be generated by any of the user agents or the proxy servers.

OPTIONS

The OPTIONS method is used to query a user agent about its capabilities. The response to the OPTIONS method lists the capabilities of that user agent.

Firewalls and NATs in SIP

As previously indicated, firewalls and NATs pose problems in SIP. The firewall needs to understand SIP and open up holes to allow traffic to pass in and out of the network. NATs are a challenge too, because once the request is forwarded outside the intranet, its originating private IP address would be converted by the NAT to a publicly routable one. Since addresses and port numbers are sent as part of SIP message bodies, the addresses and port numbers will have to be converted by the NAT as well.

SIP Implementation of the Network Communication Bridge

Currently, the SIP signaling channel can either communicate using the TCP or UDP protocols. Thus, the data channels employed by the network communication bridge 300 must conform to TCP or UDP. The determination of whether a system is publicly reachable is different for TCP and UDP implementations.

Generally, in order to implement the present invention using SIP, two new methods are added to SIP, referred to herein as AMIPUBLIC (Am I Public?) 1000, discussed below in conjunction with FIG. 10, and MAKEMEPUBLIC (Make Me Public!) 1100, discussed below in conjunction with FIG. 11, as part of the test and communication session establishment process. The AMIPUBLIC method 1000 and the MAKEMEPUBLIC method 1100 are executed by the registrar 900 and the SIP bridge proxy servers 950, respectively, to implement aspects of the present invention. The AMIPUBLIC method 1000 involves a test mechanism to determine if the user agent 910, 920 is publicly addressable.

Based on the results of the AMIPUBLIC method, the user agent 910, 920 can either register using the REGISTER method or make itself publicly addressable by establishing a persistent session with a SIP bridge proxy server 950 (stateful SIP proxies with extended capabilities). The MAKEMEPUBLIC method is sent by the user agent 910, 920 to the SIP bridge proxy server 950 as part of the persistent session establishment process. The SIP bridge proxy server 950 relays packets to aid communication between systems that cannot ordinarily initiate communication with each other. It is important to note that the implementation of the present invention does not require the services of a bi-directional NAT or an ALG working in conjunction with the NAT. In addition, the present invention does not interfere with any of these servers if they are available.

AMIPUBLIC (Am I Public) Method

AMIPUBLIC is a method to check if the user agent 910, 920 is publicly addressable. A user agent 910, 920 sends this method to the registrar 900. The registrar 900 then executes the AMIPUBLIC method 1000 to conduct tests to check the user agent status, in a similar manner to the registration process 600 discussed above in conjunction with FIG. 6. The AMIPUBLIC method is optional and not a prerequisite to the REGISTER method. Those user agents 910, 920 that know that they are publicly addressable could directly register with the registrars using the REGISTER method. Similarly, those user agents 910, 920 that know that they are not publicly addressable could skip the AMIPUBLIC test method and proceed directly to the MAKEMEPUBLIC method. Clients can even use AMIPUBLIC to test their addressability status without later registering and using other SIP services.

The Client (user agent) 910, 920 that wants to know its address status, sends an AMIPUBLIC method to the registrar 900. The format of the AMIPUBLIC method is the same as the REGISTER message from the SIP protocol, except that REGISTER is replaced by AMIPUBLIC. The Contact header will contain the client's domain name or IP address, and SIP port number, where the client can be reached. While the registrar 900 will check if this SIP signaling channel is publicly reachable, as discussed above in conjunction with FIG. 6, it is also suggested that the user agent open TCP and UDP ports and listen for requests on those ports. In each case, the client must open a non-standard port, i.e., one that is not a well-known port number used by a standard protocol, as it would help determine if the firewall is dropping communication initiation packets to non-standard port numbers. Non-standard port numbers are opened for data transfer and we would like to verify if the client can successfully accept requests sent to a non-standard port number. The registrar 900 determines if these data ports are publicly addressable or reachable via a NAT-translated IP address.

If the user 910, 920 is publicly reachable, then the user agent 910, 920 can receive requests from any system on any port. If the user 910, 920 is reachable via a NAT address, the user 910, 920 may be publicly reachable via that address on a permanent (static NAT) or temporary basis (dynamic NAT). The user 910, 920 can take additional actions to determine if the NAT is static or dynamic. The registrar 900 notifies the client of the results of these tests and recommends a list of SIP bridge proxy servers 950 in case any of the above tests show that the user is not publicly addressable. When the AMIPUBLIC is sent via UDP, a partial list might be sent to remain within the size limit of a UDP packet. The proxies in the list can be varied to provide load balancing.

Figure 10:
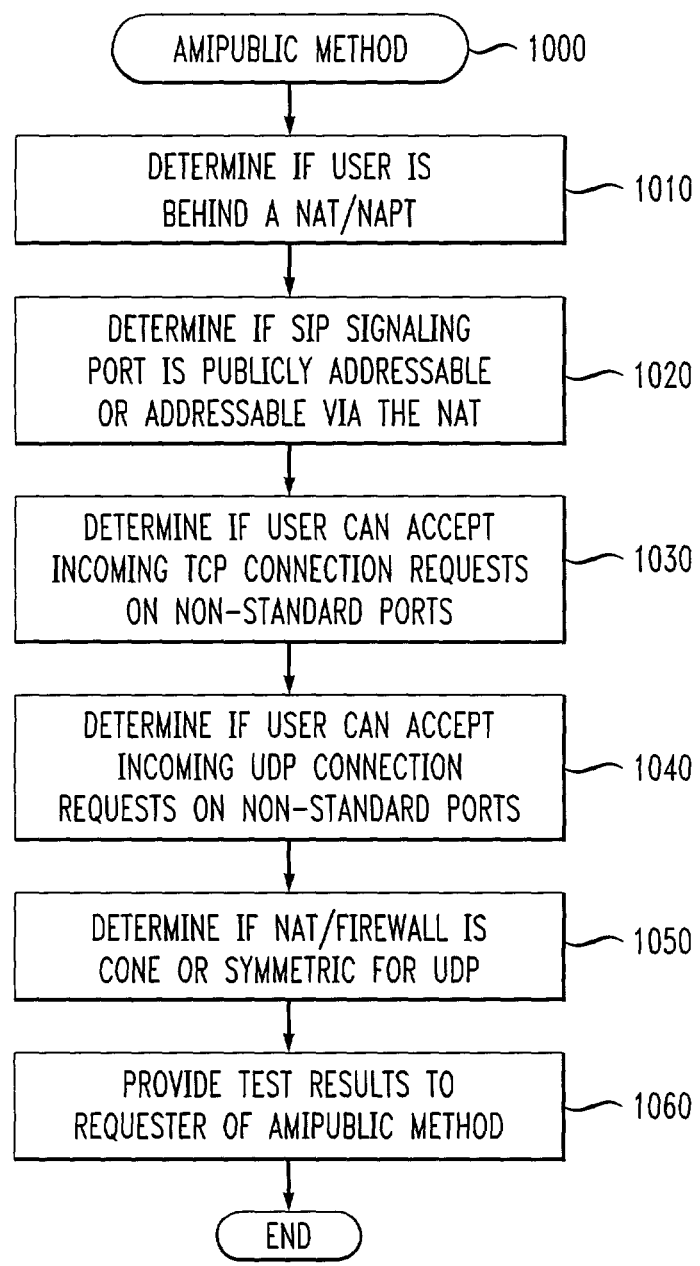
FIG. 10 is a flow chart describing an exemplary implementation of the AMIPUBLIC method of FIG. 9.

FIG. 10 is a flow chart illustrating the AMIPUBLIC method 1000. As shown in FIG. 10, the AMIPUBLIC method 1000 conducts the following tests:
1. Check if the user is behind a NAT/NAPT (Step 1010);
2. Check if the SIP signaling port is publicly addressable or addressable via the NAT (Step 1020);
3. Check if the user can accept incoming TCP connection requests on non-standard ports (Step 1030);
4. Check if the user can accept incoming UDP connection requests on non-standard ports (Step 1040);
5. Check if the NAT/firewall is cone or symmetric for UDP (Step 1050); and
6. Provide test results to requester of AMIPUBLIC method 1000 (Step 1060).

The details of each test are discussed hereinafter. Generally, Test 1 involves no additional communication. Tests 2 through 5 can be done sequentially or in parallel. Parallel testing can reduce the delay in receiving test results and the number of keep-alive messages sent by the requester to maintain a path through the firewall. The exemplary embodiment discussed herein employs a sequential implementation. It is noted that in parallel testing, attention must be paid to cases where redundant or unnecessary tests can be avoided. For example, Test 5 is unnecessary if Tests 2 through 4 succeed.

The exemplary embodiment uses a technique proposed in the IETF to describe the endpoints of a TCP connection in SDP. See, D. Yon, "TCP Based Media Support in SDP" Internet Draft (October 2000). The present invention extends the direction parameter proposed in TCP to specify the active and passive side of a session in UDP and extends SDP with a 'data' media type to support conventional TCP/UDP sessions.

As part of the AMIPUBLIC method sent by the user agent 910, 920 to the registrar 900, the user agent 910, 920 can also specify TCP and UDP ports on which it is waiting for connection requests. These port numbers are sent in an SDP message body in the AMIPUBLIC request. After receiving the AMIPUBLIC message, the registrar 900 tries to communicate with the user agent 910, 920 on the IP address and port number specified in its Contact header. This is just to verify if the client 910, 920 can receive outside communication requests on its SIP signaling channel. The user agent 910, 920 could use either TCP or UDP for the SIP signaling channel. Here, it is assumed that if the registrar 900 is able to send requests to the client 910, 920, any machine outside the enterprise will be able to do so as well.

If the user agent 910, 920 wants to test UDP ports for receiving data, the exemplary embodiment of the present invention requires that the user agent 910, 920 send the AMIPUBLIC method over UDP. The user agent 910, 920 can still use TCP for its main SIP signaling channel by specifying TCP as the protocol in its Contact header. If the user agent 910, 920 only wants to use TCP for both data and SIP signaling channel, then the user agent 910, 920 can send the AMIPUBLIC method over TCP. For UDP AMIPUBLIC messages, the exemplary embodiment of the present invention requires the user agent 910, 920 to specify a different UDP source port (in the UDP header) from its SIP signaling channel. For further tests, the exemplary embodiment of the present invention also requires that the port specified in the UDP header listen for messages from the registrar and be able to respond successfully to SIP OPTIONS methods sent by the registrar. This is the only capability required of this UDP port.

The following is an exemplary format of an SDP message body of the AMIPUBLIC method. This implies that A (having an IP address 200.1.1.2) is listening for data connection requests on TCP port 5400 and requests on UDP port 5401.

c=IN IP4 200.1.1.2/5000
   m=data 5400 TCP 0
   a=direction:passive
   m=data 5401 UDP 0
   a=direction:passive If the user agent 910, 920 is using UDP for sending out the AMIPUBLIC method, the message can be retransmitted, e.g., every 30 seconds, to keep the path in the firewall/NAT open in case the user agent is behind a NAT/firewall. We now look at each of the five tests in detail.

Test 1: Is User Agent Behind a NAT or a NAPT?

The registrar 900 checks the Via header to see if there is a received tag appended along with the user agent's IP address. The received tag indicates that the request was received on an IP address that is different from the one on which it was sent. To check if the port number has been translated, the rport tag proposed in the "NAT Friendly SIP" draft, referenced above, is used. If there is a received tag and a rport tag, then the user agent 910, 920 could be behind a NAT and the registrar 900 makes a note of this possible NAT IP address and port number for the user agent 910, 920, for example, in the registered user database 700.

If the registrar 900 itself received the request directly from the user agent 910, 920, the registrar 900 notes the address from which it received the request, and compares that address and port number with the contact method for the user agent 910, 920. A difference in just the IP addresses indicates a possible NAT address for the user agent 910, 920; a difference in both the address and port indicates the possibility of a NAPT.

Test 2. Is SIP Signaling Port Publicly Addressable or Addressable Via NAT?

Once the registrar 900 determines if a NAT might be present, the next task of the registrar 900 is to check if the SIP signaling port is publicly reachable. The registrar 900 sends the user agent 910, 920 an OPTIONS method to the address specified in the Contact header of the AMIPUBLIC method. If the user agent 910, 920 successfully receives the OPTIONS method, the user agent 910, 920 sends back its list of capabilities to the registrar 900. For clarity, the procedure to test this signaling channel is discussed separately for TCP and UDP.

Test Procedure for SIP Signaling Channel Running Over TCP

If TCP is the underlying protocol, the registrar 900 simply connects to the user agent 910, 920 using TCP and sends the user agent 910, 920 a SIP OPTIONS method. If the registrar 900 is unable to establish a TCP connection with the user agent 910, 920, then the SIP signaling channel is not publicly reachable for TCP. If tests fail and a possible NAT address has been noted, the registrar 900 tries to send the user agent 910, 920 an OPTIONS method (but to the NAT's IP address and the SIP port umber of the user agent 910, 920). If this is successful, the user agent 910, 920 is behind a NAT. The user agent 910, 920 either has a static or dynamic address translation. The user agent 910, 920 then has the option of either conducting this AMIPUBLIC test over a period of time to ensure the address is static or playing it safe by establishing a persistent session with a SIP bridge proxy server 950 to ensure that the translation remains in place.

If, however, the OPTIONS method to the NAT's IP address did not elicit a response from the user agent 910, 920, the registrar 900 concludes that the user agent 910, 920 is not publicly addressable and recommends that the user agent 910, 920 maintain a persistent connection with a SIP bridge proxy server 950 to receive SIP incoming messages.

Test Procedure for SIP Signaling Channel Running Over UDP

If the registrar 900 receives the AMIPUBLIC method from the user agent 910, 920, the registrar 900 responds with an OPTIONS method to the user agent 910, 920 on its SIP signaling channel. The registrar 900 must specify a different source UDP port from its SIP signaling port when sending the OPTIONS method over UDP. If the registrar 900 does not receive the user agent's response to its OPTIONS query and there is the possibility of a NAT, the registrar 900 again tries to send the OPTIONS method to the user agent 910, 920, but specifying the NAT's IP address and the user agent's SIP port. If the registrar 900 receives an answer from the user agent 910, 920, it notes that the user agent 910, 920 is behind a NAT. In this case, the user agent 910, 920 would again have the option of testing whether this is a static or dynamic translation. Since the user agent 910, 920 refrains from making requests on the UDP signaling channel before testing the channel, a positive result to this test indicates that the IP address is public or the result of a simple NAT translation, not the result of a cone or symmetric path through the NAT/firewall.

When the tests fail, the registrar 900 recommends a persistent session with a SIP bridge proxy server 950. There remains the possibility that the NAT or firewall will dynamically open short-term symmetric or cone paths in response to an outgoing UDP message. We test this case in our UDP data connection test and annotate the result for UDP signaling as well. As described above, the ways to optimize UDP processing with the bridge proxy server 500 differ depending on the type of opening made through the NAT or firewall.

If UDP is the underlying protocol for sending the AMIPUBLIC method, the client 910, 920 will not receive a response from the registrar 900 when a firewall drops the outgoing AMIPUBLIC UDP packet. If the client 910, 920 can receive incoming UDP response packets, the client 910, 920 will get a response from the registrar 900 containing the results of the AMIPUBLIC method. If the client 910, 920 does not get any response from the registrar 900 after a reasonable period of time, the client 910, 920 should timeout and use TCP as the underlying protocol for the AMIPUBLIC method. The user agent 910, 920 can also then assume that it is not publicly addressable for UDP and cannot establish UDP data connections with any other system. Thus, it must not send UDP data ports for testing as part of the SDP message body.

If the user agent 910, 920 received the OPTIONS method sent by the registrar 900 and responded to it, the registrar 900 concludes that the SIP signaling channel of the user agent 910, 920 is publicly addressable. If the registrar 900 did not receive a response or in the case of TCP, failed to connect to the user agent's SIP port, it is recommended that the user agent 910, 920 establish a persistent session with a SIP bridge proxy server 950. The details of establishing persistent sessions are discussed below in the section entitled "MAKEMEPUBLIC Method."

Test 3: Can User Accept Incoming TCP Connection Requests on Non-Standard Ports?

Once the registrar has completed checking the reachability of the SIP signaling channel, it needs to test if the user agent's TCP data port (if specified) is publicly reachable. The registrar may have determined in the earlier test whether the user agent has a public address or an address behind a NAT. If it received all negative results in prior testing, it may be unsure of the address to test, so the registrar tests one address if the determination has been made or two addresses if the determination is still in question. The registrar tries to initiate a connection to the client on the TCP non-standard port specified by the client in the SDP message body of the AMIPUBLIC method. If the client successfully receives the connection initiation from the registrar, it echoes back whatever is sent. If however the client is protected by a firewall that blocks incoming connection initiations or if the client's private address cannot be reached via a NAT, the client will be unable to receive and respond to the connection request sent by the registrar. The registrar can thus determine if the client can be contacted or not for receiving data on TCP. Note that if contact is made through a NAT, the client will be publicly addressable for dynamic, as well as static NATs, if the client maintains its NAT translation by keeping a persistent session alive with a bridge proxy server 500.

Test 4: Can User Accept Incoming UDP Connection Requests on Non-Standard Ports?

In the example outlined above, the user agent 910, 920 is passively listening for connections on UDP port 5401. As previously mentioned, the registrar 900 may or may not know, based on previous tests, if the user agent 910, 920 is behind a NAT. The registrar 900 tests one address if the determination has been made or two addresses if the determination is still in question. The registrar 900 tries to contact the client 910, 920 on this passive port. If the client 910, 920 receives this test message from the registrar 900, the client 910, 920 echoes back whatever the registrar 900 sent the client 910, 920 on this port. If the registrar 900 receives the client's message, the registrar 900 concludes that the client 910, 920 is addressable for UDP data as well. The client 910, 920 is publicly addressable if it is not behind a NAT, if the NAT translation is found on later testing to be static, or if it keeps its dynamic NAT translation alive by maintaining a persistent session with the SIP bridge proxy server 950.

If, however, the registrar 900 did not receive a reply to the message the registrar 900 sent the user agent 910, 920 on the UDP data port, the registrar 900 knows that the user agent 910, 920 is not publicly addressable. If any of the UDP tests fail, the registrar 900 then tries to ascertain the type of NAT or firewall treatment that is being given to dynamic UDP traffic. The results of this test (described in Test 5) help the SIP bridge proxy server 950 to serve the needs of UDP clients.

Test 5: Is NAT/Firewall Cone or Symmetric for UDP?

As previously mentioned, if the user agent 910, 920 wants to test if the user agent 910, 920 can be publicly reached for receiving UDP data, the UDP source port from which the user agent 910, 920 sent the AMIPUBLIC message must be listening for SIP OPTIONS methods. This port is used to figure out if the user agent 910, 920 is behind a cone NAT/firewall. Even if a NAT is not present, the user agent 910, 920 could be behind a firewall that drops incoming connection requests. Whether the user agent 910, 920 can receive responses to UDP requests that the user agent 910, 920 has sent should be verified. Specifically, whether the NAT/firewall allows responses from any system or restricts responses to be from the system to which the user agent 910, 920 has sent a UDP request should be verified.

The registrar 900 sends an OPTIONS message to the client 910, 920 with the IP address and the UDP source port from which the user agent 910, 920 sent the registrar 900 the AMIPUBLIC method. We first test if the user agent 910, 920 is behind a cone NAT/firewall. Hence, the registrar 900 checks the Via header of the AMIPUBLIC message to check if the AMIPUBLIC request was routed by a SIP proxy. If the AMIPUBLIC request was routed by a SIP proxy, the registrar 900 sends an OPTIONS message to the UDP source port of the AMIPUBLIC method directly. If the AMIPUBLIC request was not routed by a SIP proxy (and the message came directly to the registrar 900), the registrar 900 sends the OPTIONS method to a proxy residing at a different IP address from the registrar 900, to be forwarded to the user agent 910, 920. If the user agent 910, 920 can receive and respond to this OPTIONS message on the UDP source port from which the AMIPUBLIC message was sent, it is concluded that the user agent 910, 920 is behind a cone NAT/firewall.

If the user agent 910, 920 does not respond to this OPTIONS request sent to it either by the registrar 900 or SIP bridge proxy server 950, the registrar 900 concludes that the user agent 910, 920 is not behind a cone NAT/firewall after doing a reasonable number of retries for the user agent's response. The registrar 900 then needs to check if the user agent 910, 920 is behind a symmetric NAT/firewall. To this end, the registrar 900 either directly sends the user agent 910, 920 the OPTIONS message or in case the proxy received the AMIPUBLIC, forwards and has the SIP bridge proxy server 950 send the OPTIONS message. If the user agent 910, 920 responds to this message, the registrar 900 then concludes that the user agent 910, 920 is behind a symmetric NAT/firewall. If the user agent 910, 920 does not respond to this message either, the user agent 910, 920 cannot receive responses to UDP messages and the user agent 910, 920 then has to try the AMIPUBLIC test with only TCP for both data and the main signaling channel.

If all the above tests were successful, the registrar 900 sends back a 200 OK message to the client 910, 920. The client 910, 920 can then register under its own IP address and SIP port number by sending the registrar 900 a REGISTER method. If on the other hand, any of the above tests failed, the registrar 900 sends back a 380 'Use alternate service' error message to the client 910, 920. The message body contains the results of the tests conducted by the registrar 900. If the user agent 910, 920 has a public address, the following format is used:

SIP main: Yes/No/Symmetric/Cone
TCP data: Yes/No
UDP data: Yes/No/Symmetric/Cone It is noted that the Cone or Symmetric type applies only for the UDP protocol. In the case of the TCP protocol, the options would be either yes or no.

If, however, the user agent 910, 920 has a NAT address, the following format is used:

NAT: <address, port discovered>
SIP main: Yes/No/Symmetric/Cone
TCP data: Yes/No
UDP data: Yes/No/Symmetric/Cone The registrar 900 also sends as part of the message body a list of SIP bridge proxy servers 950 with whom the client 910, 920 can establish a persistent connection.

If the client's main SIP channel is publicly addressable, it implies that the client 910, 920 can receive SIP requests on this port. Hence, it does not require a persistent connection with the SIP bridge proxy server 950. If on the other hand, the SIP signaling channel of the client 910, 920 is not publicly addressable, the client 910, 920 will have to maintain a persistent session with the SIP bridge proxy server 950. If the user agent 910, 920 wants to use UDP for its signaling channel and is determined to be behind a cone NAT/firewall, then the user agent 910, 920 needs to maintain a persistent session with the SIP bridge proxy server 950 and send periodic 'keep alive' messages. Depending on the AMIPUBLIC results, the user agent 910, 920 might have to establish data sessions with the SIP bridge proxy server 950, when required, if the user agent 910, 920 cannot receive data on non-standard ports. It is noted that while the client 910, 920 should maintain a persistent session so that the user agent 910, 920 does not miss any calls, it is entirely up to the user whether he/she wants the client to maintain a persistent session with the proxy server 950.

In some situations, especially when the enterprise firewall is rigidly configured, the firewall may mistake the test communications from the registrar 900 to be attacks and shut out all future communications with the registrar 900. In such situations, the registrar 900 should be added as a trusted host while configuring the firewall. Also, in the case when all the systems in the enterprise are configured alike, a further optimization is possible. Just one system can send out the AMIPUBLIC method and share the results with other hosts in the enterprise. The other systems can then just send out MAKEMEPUBLIC methods (if required) and learn their external addresses (in case a NAT is deployed) from the MAKEMEPUBLIC response.

MAKEMEPUBLIC (Make Me Public) Method

If any of the above tests conducted by the registrar 900 as part of the AMIPUBLIC method 1000 was not successful, the registrar 900 will send back the 380 'Use alternate service' error message to the client. In order to be successfully registered, the client 910, 920 will have to send one of the SIP bridge proxy servers 950 (recommended by the registrar) a MAKEMEPUBLIC method.

Figure 11:
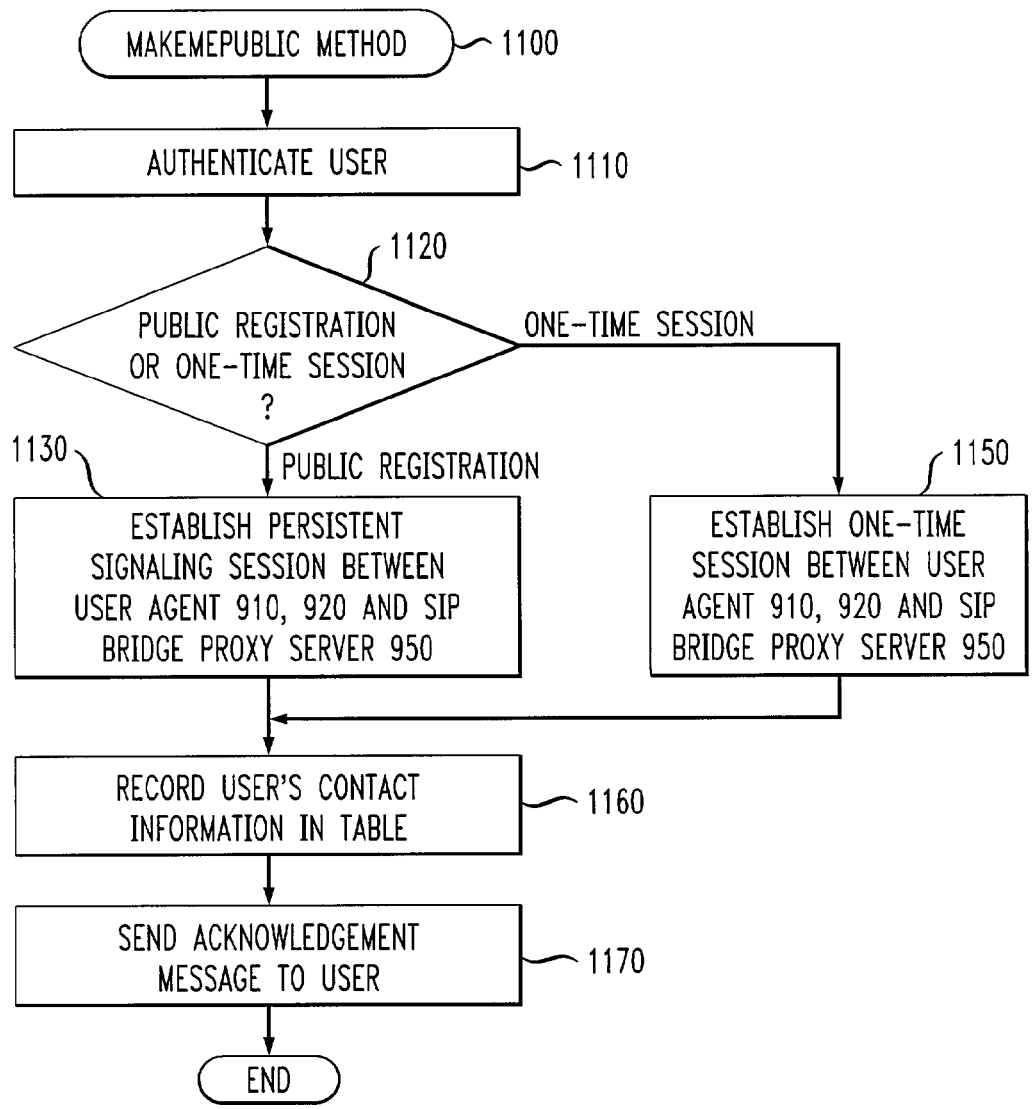
FIG. 11 is a flow chart describing an exemplary implementation of the MAKEMEPUBLIC method of FIG. 9.

FIG. 11 is a flow chart describing an exemplary implementation of the MAKEMEPUBLIC method 1100 executed by a SIP bridge proxy server 950. As shown in FIG. 11, the MAKEMEPUBLIC method 1100 initially authenticates the client 910, 920 during step 1110, for example, using the same authentication mechanism as the registration servers to authenticate clients issuing the REGISTER method. In the MAKEMEPUBLIC message body, the client 910, 920 will send the SIP bridge proxy server 950 the test results sent to it by the registrar 900. For optimization purposes, the client can directly send the SIP bridge proxy server 950 the test results (if the client 910, 920 knows what the test results will be) without sending the AMIPUBLIC method 1000. As part of the MAKEMEPUBLIC request, the user agent 910, 920 can also specify 'Public Registration' in the User-Agent header, to indicate that the user agent 910, 920 wants to make itself public for receiving SIP services. The MAKEMEPUBLIC method 1100 is also used when the user agent 910, 920 wants to maintain a one-time session for sending or receiving data. In this case, the User-Agent header is set to "Cone Data."

A test is performed during step 1120 to determine if the user 910, 920 has specified a public registration or a one-time session. If it is determined during step 1120 that the user 910, 920 has specified a public registration, then a persistent signaling session is established during step 1130 between the user agent 910, 920 and the SIP bridge proxy server 950. If the client 910, 920 cannot receive SIP requests, then the client 910, 920 needs to maintain this session persistently with the SIP bridge proxy server 950. If, however, it is determined during step 1120 that the user 910, 920 has specified a one-time session, then a one-time session for sending or receiving data is established during step 1150.

The SIP bridge proxy server 950 records the contact information about the user agent 910, 920 in a table during step 1160, such as a unique username, <IP address, Port number>, socket for persistent sessions, whether a persistent session is required, whether TCP data connection support is required, and whether UDP data connection support is required for a cone or symmetric NAT/firewall. An exemplary table entry would look as follows:

username@bridgeproxy.com, <200.10.10.10,5060>, < >, False, True, cone

This implies that the user (username@bridgeproxy.com) can be contacted at 200.10.10.10:5060, the socket is null, no persistent connection is required, and the user would need help from the SIP bridge proxy server 950 to establish TCP and UDP data sessions. As an optimization, the SIP bridge proxy server 950 can establish a connection with the user as needed via the public SIP signaling channel and does not maintain a persistent session with the user. Depending on whether the user agent 910, 920 is publicly addressable or not, the SIP bridge proxy server 950 would have the client's own IP address and SIP port number or the address and port of the persistent connection maintained with it in its table. It is noted that if the user agent 910, 920 is behind a NAT, the address and port translated by the NAT are maintained by the SIP bridge proxy server 950 in its table. The SIP bridge proxy server 950 uses information from this table for routing SIP messages to the user 910, 920.

Once the SIP bridge proxy server 950 records the client's details in its table during step 1160, the SIP bridge proxy server 950 sends back a 200 OK message to the user agent 910, 920 during step 1170. As part of the message body, the SIP bridge proxy server 950 sends back to the client the SIP bridge proxy server 950 its external IP address and port number (the NAT translated address and port of the user agent). The proxy server 950 registers the client with the registrar 900 using the IP address and SIP port of the SIP bridge proxy server 950 via the third party registration technique specified in SIP's REGISTER method. In case the user agent 910, 920 is publicly addressable for TCP and at least behind a cone NAT/firewall for UDP, the SIP bridge proxy server 950 registers the user agent 910, 920 using the user agent's publicly routable address.

As discussed above in conjunction with FIG. 7, the registrar 900 maintains a table 700 where a user's location is mapped to the IP address and port number on the proxy server. When any client queries the location service of the registrar 900 for a user's contact details, the location service 900 sends the address of the proxy server (whenever a persistent session has been established to make the client public for some SIP services). The SIP bridge proxy server 950 is responsible for refreshing the client's registration with the Registrar 900 at appropriate intervals and for removing the registration if connectivity with the client is lost.

Communication Through Network Communication Bridge Implemented Using SIP

TCP Communications

Assume user A wants to initiate a connection to user B using TCP data sessions. It is noted that both A and B can receive SIP requests as they can be either publicly reachable on their SIP ports or will be maintaining persistent connections to a SIP bridge proxy server 950. There are three possible cases.

Case 1: A is Publicly Reachable

In this case, we do not care if B is publicly reachable. User A knows that it is publicly addressable since it would have received a 200 OK message to its AMIPUBLIC test. Before user A sends an INVITE message to user B, user A opens and starts listening on a port. This port number is sent in the SDP message body as part of the following INVITE method that A sends B:

c=IN IP4 200.1.1.2/2047
m=data 54000 TCP 0
a=direction:passive where "200.1.1.2" indicates A's IP address and "2047" is the source port from which A is sending that message. "54000" is the port on which A wants B to connect to A using TCP.

The invite message is sent to B either directly (if B's SIP signaling channel is publicly reachable) or through the appropriate SIP bridge proxy server 950 (if B is using some services of the SIP bridge proxy server 950). If user B wants to talk to user A, user B responds to A's invite message by sending user A an OK message and then initiating a connection to user A on the port number user A specified in the INVITE message.

Case 2: A is not Publicly Reachable, B is Publicly Reachable

In this case, user A will send a SIP INVITE message to user B, but since user A cannot receive connection initiations from outside the enterprise machines, user A specifies the direction as active in the following SDP message body. Since the direction is active, the port number can be set to 9 by user A and can be ignored by the recipient. An example of a SDP message for this case is:

c=IN IP4 200.1.1.2/2047
m=data 9 TCP 0
a=direction:active

When user B (having IP address 199.10.10.2) gets this INVITE message and realizes that user A is not publicly reachable, but user B itself can receive connection initiations, user B opens a port (in this case 24000) and waits for user A to initiate a connection to user B on that port. User B specifies this port number and its own IP address in the SDP message body user B sends along with the 200 OK method back to user A, as follows:

c=IN IP4 199.10.10.2/2000
m=data 24000 TCP 0
a=direction:passive

User A then connects to user B on the specified port number.

Case 3: Neither A Nor B are Publicly Reachable

In this case, the services of the SIP bridge proxy server 950 are required for establishing the data connection. When user A sends an INVITE message to user B with a special port number and direction set to active in the SDP message (an indication that a port number has to be arranged by user B for the communication), the INVITE message gets routed to the appropriate SIP bridge proxy server 950 for user B. The proxy 950 knows that user B is not publicly addressable, and hence will open a port for user B to connect to the proxy 950. The proxy 950 rewrites the SDP message body of A's INVITE using this port number and will route A's INVITE to B's SIP signaling channel. If user B responds with a 200 OK message to A's invite message, the SIP bridge proxy server 950 opens a port for A to connect to and forwards B's 200 OK message to user A, adding its own IP address and the port number the proxy 950 has set up for A in the SDP message body.

User A then sends back an ACK message for the 200 OK that user A received from user B. User B connects to the port number specified by the SIP bridge proxy server 950 and user A does the same. All messages sent by user A will now go to this proxy and these are relayed by the proxy to user B through the data connection user B has started with the proxy.

UDP Communications (for Proposed Symmetric UDP Sessions)

In the case of UDP sessions, a user system could be publicly addressable, be behind a symmetric NAT/firewall or be behind a cone NAT/firewall. Now, consider the cases when user A wants to talk to user B. UDP data transfer itself has two cases. One occurs when symmetric initiation of communication is possible. This case is similar to TCP, because clients specify the direction as active or passive in the SDP message. In the second case, a system must have a port ready when the system sends the INVITE method.

First, consider the case of a symmetric UDP communication initiation, such as a symmetric Real Time Protocol (RTP), described in D. Hoffman et al., "RTP Payload Format for MPEG1/MPEG2 Video," RFC 2250 (January, 1998). In the case of symmetric RTP, the technique of specifying direction as either active or passive is possible. Essentially, the ports that listen for data also send data (unlike the current implementations of RTP). Other UDP applications can be made symmetric by establishing an initial message (which can be discarded by the recipient) to be sent by whichever party is active. In symmetric communication initiation, the following cases arise. It is noted that the services of the SIP bridge proxy server 950 for relaying messages are not utilized except when both A and B are behind symmetric NATs/firewalls.

Case 1: A is Publicly Reachable; B is Publicly Reachable or Behind a NAT/Firewall A is publicly reachable. In this case, B's status does not matter. As in Case 1 for TCP sessions, user A listens on a port and sends this port and its publicly reachable address as part of the SDP message body. User A specifies its direction as passive. User B then connects to the port specified by user A and they carry out their communication.

Case 2: A is Behind a Cone NAT/Firewall; B is Public or Behind a NAT/Firewall

In this case, user A is behind a cone NAT/firewall. User A can be publicly addressed provided user A has sent out a UDP packet thereby creating a path in the firewall to receive data. In this case, user A starts listening on a socket and sends out a MAKEMEPUBLIC method 1100 to the SIP bridge proxy server 950 from this source port. In the User-Agent header, user A specifies 'Cone Data' and puts its SIP signaling port in the Contact header. The SIP bridge proxy server 950 realizes that user A just wants to know its external IP address and port as user A wants to establish a data channel with another system. The SIP bridge proxy server 950 sends back to user A its external IP address and the port number user A will be listening for requests. Thus, a path is opened in the firewall for packets from user B to reach user A. User A then sends out an INVITE message to user B, specifying in the SDP message body, the IP address and port number that the SIP bridge proxy server 950 sent in response to user A's MAKEMEPUBLIC method. User B then directly connects to user A.

Case 3: A is Behind a Symmetric NAT/Firewall; B is Public or Behind a NAT/Firewall In this case, user A is behind a symmetric NAT/firewall. User A sends out an INVITE to user B, but specifies in its SDP message body that it wishes to be the active side of the connection. If user B is publicly reachable, user B listens on a port and sends this port to user A. User A initiates communication with this port. If user B is behind a cone NAT/firewall, user B listens on a port and sends the appropriate SIP bridge proxy server 950 a MAKEMEPUBLIC message 1100 with User-Agent set to 'Cone Data' from this port. User B gets back its external IP address and port from the SIP bridge proxy server 950. There is now a path in the NAT/firewall as user B has sent out a UDP packet from the port that user B wishes user A to connect to. In its 200 OK message to user A, user B specifies its external IP and port number for the MAKEMEPUBLIC response and tells user A that it is willing to be the passive side of the connection. User A then connects to this port. If user B is also behind a symmetric NAT/firewall, the situation is exactly similar to Case 3 for TCP data, discussed above. User A's invite message reaches the appropriate SIP bridge proxy server 950 for user B, which knows that user B, being symmetric, is incapable of supplying a port to user A. As in the TCP case, the SIP bridge proxy server 950 listens on two ports (one to which user A connects and the other to which user B connects) and rewrites the SDP messages appropriately. Before the SIP bridge proxy begins relaying data, A and B activate their paths for receiving data from the proxy by sending a message to the proxy on the port provided. This opens a hole through the symmetric firewall for communication from the proxy. The SIP bridge proxy server 950 then relays messages between users A and B.

ULDP Communications (for Existing UDP Sessions)

To ensure backward compatibility, the present invention supports existing UDP data session transfers. Here, a system that wants to communicate with another system must specify its address and port in the INVITE message itself. For example, classic RTP specifies the port number for receiving data in the SDP message. It also implicitly specifies the next sequential port number for its control protocol RTCP. Like the NAT Friendly SIP draft, referenced above, the port for RTCP should be specified explicitly in the SDP message. Otherwise, a NAPT may allocate non-consecutive ports to RTP and RTCP and this will not be communicated appropriately.

There is no concept of changing the direction of communication initiation and hence, when user A wants to talk to user B, user A must specify the port where user B can send data. Similarly, when user B sends back an OK message to user A, user B must specify another port where user A can send data. Thus, users A and B both must have ports for receiving data from each other. Also, users A and B cannot send data from the same port on which they are listening for data from the other party. In other words, both users A and B must have two ports each, one to send data and the other to receive data. This therefore requires the services of the SIP bridge proxy server 950 for relaying messages when either of the systems is behind a symmetric NAT/firewall. When both users A and B are behind symmetric NATs/firewalls, the services of two SIP bridge proxy servers 950 are required for relaying messages.

In order for the SIP bridge proxy servers 950 to provide ports beforehand for the systems, a new User-Agent header option is proposed called 'Symmetric Data' for the MAKEMEPUBLIC methods. When the user agent A sends out a MAKEMEPUBLIC method with the User-Agent header set to 'Symmetric Data,' the SIP bridge proxy server 950 realizes that the user agent is requesting a port for establishing a UDP data session. The SIP bridge proxy server 950 then opens two ports and sends these ports and the IP address of the SIP bridge proxy server 950 back to the user agent (one for A to receive data from and the other for B to send data to). User agent A then activates its port for receiving data from the proxy by sending a message to the proxy at that port number. This opens a hole through the symmetric firewall for communication from the proxy 950 to A.

Case 1: A is Publicly Reachable; B is Publicly Reachable or Behind a NAT/Firewall User A, being public, can send a port number to user B in its SDP message body. If user B is also public, user B can also send a port number back to user A. If user B is behind a cone NAT/firewall, user B can send out a MAKEMEPUBLIC method with the User-Agent header set to 'Cone Data' to the appropriate SIP bridge proxy server 950. As discussed above, this creates a path in the NAT/firewall and user A can send data to user B on this port. If, however, user B is behind a symmetric NAT/firewall, user B needs to establish a communication channel with its SIP bridge proxy server 950. User B sends its SIP bridge proxy server 950 a MAKEMEPUBLIC message with the User-Agent header set to 'Symmetric Data.' The SIP bridge proxy server 950 then creates two ports, one for user A to use to send data to user B and one for user B to use to receive user A's messages. A possible port usage optimization would use one port for relaying UDP traffic between users A and B at the expense of reading the packet to determine its destination.

User B sends the port number created by the SIP bridge proxy server 950 for user A in its 200 OK message and connects to the port on the SIP bridge proxy server 950 meant for user B. User B also begins communication on the port number set by user A (in user A's INVITE message) to send user A data. User A now initiates communication with the port on the SIP bridge proxy server 950 for sending data to user B. Thus, user B can send data directly to user A, while user A sends data meant for user B to user B's SIP bridge proxy server 950 which is then relayed to user B.

Case 2: A is Behind a Cone NAT/Firewall; B is Public or Behind a NAT/Firewall

In this case, user A sends out a MAKEMEPUBLIC method with the User-Agent set to 'Cone Data' to the SIP bridge proxy server 950. This creates a path through the NAT/firewall and thus makes user A publicly reachable. The remaining communication is along the same lines as Case 1, discussed above. If user B is public or is behind a cone NAT/firewall, users A and B can talk directly to each other. If user B is behind a symmetric NAT/firewall, user B requires the services of the SIP bridge proxy server 950 as described in Case 1.

Case 3: A is Behind a Symmetric NAT/Firewall; B is Public or Behind a NAT/Firewall If user A is behind a symmetric NAT/firewall, it sends out a MAKEMEPUBLIC method with the User-Agent set to 'Symmetric Data' to the SIP bridge proxy server 950. The SIP bridge proxy server 950 opens two ports, one with which user A initiates communication and the other with which user B initiates communication. As described in the previous cases, if user B is public, user A can send data directly to user B, while user B sends data meant for user A to the SIP bridge proxy server 950. If user B is behind a cone Nat/firewall, user B creates a path in the NAT/firewall by sending out the MAKEMEPUBLIC method with the User-Agent set to 'Cone Data' to its SIP bridge proxy server 950. In this case, as in the case when user B was public, user A sends data directly to user B, while user B sends data to the SIP bridge proxy server 950, which is relayed to user A. When user B is also behind a symmetric NAT/firewall, both users A and B will have to send MAKEMEPUBLIC methods to their respective SIP bridge proxy servers 950 with the User-Agent set to 'Symmetric Data'. Thus, both the SIP bridge proxy servers 950 will be required to set ports for communication with the other end, user A would send data to user B's SIP bridge proxy server 950 and user B would send data for user A to user A's SIP bridge proxy server 950.

Conclusion

The network communication bridge 300 of the present invention allows connectivity between any two systems. Thus, the network communication bridge 300 can be put to use in numerous ways. An independent implementation of the architecture of the present invention would be a lightweight and secure alternative to VPNs and dial-in servers (solutions that are currently used to connect to the enterprise). Any other system that needs deployment of bi-directional NATs in conjunction with ALGs and special firewall software can use the present invention for connectivity. The present invention does not require the deployment of ALGs for every application used by the systems behind a NAT. Since SIP is gaining in popularity, a SIP implementation of the present invention would enable users behind NATs and firewalls to communicate effectively with other systems for both voice and text data.

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure the associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It is to be understood that the embodiments and variations shown and described herein are merely illustrative of the principles of this invention and that various modifications may be implemented by those skilled in the art without departing from the scope and spirit of the invention.

We claim:

1. A method for determining whether a first computing system within a protected network can communicate with an external computing system, said method comprising:

receiving a registration request from at least one of said first and external computing systems;

testing, by a registrar that is positioned outside said protected network, whether at least one of the first computing system and the external computing system is publicly addressable by comparing address information indicated by said at least one of said first and external computing systems with address information indicated in a message received from said at least one of said first and external computing systems in order to determine whether said at least one of said first and external computing systems is behind a network address translator (NAT);

initiating a creation of a persistent connection between said computing system and a proxy server if said computing system is not publicly addressable; and recording an address of said proxy server for said computing system if said computing system is not publicly addressable.

2. The method of claim 1, further comprising initiating a reversal of roles between a call initiator and a call recipient if at least one party to a communication is publicly addressable.

3. The method of claim 1, further comprising providing a relay service between parties to a communication if neither party is publicly addressable.

4. The method of claim 3, wherein providing a relay service between parties to a communication if neither party is publicly addressable comprises providing a relay service performed by a SIP proxy server.

5. The method of claim 1, wherein testing whether at least one of the first computing system and the external computing system is publicly addressable further comprises attempting to connect with said computing system.

6. The method of claim 1, further comprising recording an address of said computing system if said computing system is publicly addressable.

7. The method of claim 1, wherein receiving a registration request from at least one of said first and external computing systems comprises receiving a registration request that conforms to the SIP protocol.

8. The method of claim 1, further comprising propagating results of said testing to one or more additional computing systems.

9. The method of claim 8, wherein propagating results of said testing to one or more additional computing systems comprises propagating results of said testing to one or more additional computing systems are within the same subnetwork as said computing system providing said registration request.

10. A system for determining whether a first computing system within a protected network can communicate with an external computing system, said system comprising:
 a memory that stores computer-readable code; and
 a processor operatively coupled to said memory, said processor configured to implement said computer-readable code, said computer-readable code configured to:
  receive a registration request from at least one of said first and external computing systems;
  testing, by a registrar that is positioned outside said protected network, whether at least one of the first computing system and the external computing system is publicly addressable by comparing address information indicated by said at least one of said first and external computing systems with address information indicated in a message received from said at least one of said first and external computing systems in order to determine whether said at least one of said first and external computing systems is behind a network address translator (NAT);
  initiating a creation of a persistent connection between said computing system and a proxy server if said computing system is not publicly addressable; and
  recording an address of said proxy server for said computing system if said computing system is not publicly addressable.

11. The system of claim 10, wherein said processor is further configured to initiate a reversal of roles between a call initiator and a call recipient if at least one party to a communication is publicly addressable.

12. The system of claim 10, wherein said processor is further configured to provide a relay service between parties to a communication if neither party is publicly addressable.

13. The system of claim 12, wherein said relay service is performed by a SIP proxy server.

14. The system of claim 10, wherein said processor is further configured to compare address information indicated by said computing system with address information indicated in a message received from said computing system.

15. The system of claim 10, wherein said processor is further configured to attempt to connect with said computing system.

16. The system of claim 10, wherein said processor is further configured to record an address of said computing system if said computing system is publicly addressable.

17. The system of claim 10, wherein said registration request conforms to the SIP protocol.

18. An article of manufacture for determining whether a first computing system within a protected network can communicate with an external computing system, said article of manufacture comprising:
 computer readable hardware having computer readable code embodied thereon, wherein said computer readable program code instructs a processor to:
  receive a registration request from at least one of said first and external computing systems;
  test, by a registrar that is positioned outside said protected network, whether at least one of the first computing system and the external computing system is publicly addressable, by comparing address information, indicated by said at least one of the first computing system and the external computing system, with address information indicated in a message received from said at least one of the first computing system and the external computing system in order to determine whether said at least one of said first and external computing systems is behind a network address translator (NAT);
  initiate a creation of a persistent connection between said computing system and a proxy server if said computing system is not publicly addressable; and
  record an address of said proxy server for said computing system if said computing system is not publicly addressable.

* * * * *